(12) United States Patent
Mudalige et al.

(10) Patent No.: US 9,020,660 B2
(45) Date of Patent: Apr. 28, 2015

(54) EFFICIENT INTERSECTION AUTONOMOUS DRIVING PROTOCOL

(75) Inventors: Upali Priyantha Mudalige, Oakland Township, MI (US); Ragunathan Rajkumar, Monroeville, PA (US); Seyed Reza Azimi, Pittsburgh, PA (US); Gaurav Bhatia, Seven Fields, PA (US)

(73) Assignees: GM Global Technology Operations LLC, Detroit, MI (US); Carnegie Mellon University, Pittsburgh, PA (US)

( * ) Notice: Subject to any disclaimer, the term of this patent is extended or adjusted under 35 U.S.C. 154(b) by 277 days.

(21) Appl. No.: 13/468,671

(22) Filed: May 10, 2012

(65) Prior Publication Data

US 2013/0304279 A1 Nov. 14, 2013

(51) Int. Cl.
*G08G 1/09* (2006.01)
*G08G 1/16* (2006.01)
*G05D 13/00* (2006.01)

(52) U.S. Cl.
CPC ............... *G08G 1/164* (2013.01); *G05D 13/00* (2013.01); *B60Y 2300/18158* (2013.01)

(58) Field of Classification Search
CPC ............... B60T 7/00; B60T 7/12; B60T 7/16; B60W 30/08; B60W 30/085; B60W 30/09; B60W 30/095; B60W 30/0953; B60W 30/0956; B60W 30/10; B60W 30/12; B60W 30/14; B60W 30/143; B60W 30/146; B60W 30/16; B60W 30/162; B60W 40/02; B60W 40/04; B60W 2030/08; B60W 2550/20; B60W 2550/22; B60W 2250/30; B60W 2250/302; B60W 2250/304; B60W 2250/306; B60W 2250/308; B60W 2250/40; B60W 2250/402; B60W 2250/404; B60W 2250/406; B60W 2250/408; B60W 2750/00; B60W 2750/30; B60W 2750/302; B60W 2750/304; B60W 2750/306; B60W 2750/308; B60W 2750/40; B60W 2900/00; G05D 1/00; G05D 1/0005; G05D 1/0011; G05D 1/0016; G05D 1/0022; G05D 1/0027; G05D 1/0033; G05D 1/0038; G05D 11/0044; G05D 1/005; G05D 1/0055; G05D 1/0061; G05D 1/0066; G05D 1/0072; G05D 1/0077; G05D 1/0083; G05D 1/0088; G05D 13/00; G05D 2201/02; G05D 2201/0212; G05D 2201/0213; G05D 2201/0214; G08G 1/00; G08G 1/005; G08G 1/01; G08G 1/0104; G08G 1/0108; G08G 1/0112; G08G 1/0116; G08G 1/012; G08G 1/0125; G08G 1/0129; G08G 1/0133; G08G 1/0137; G08G 1/0141; G08G 1/015; G08G 1/017; G08G 1/0175; G08G 1/02; G08G 1/04; G08G 1/042; G08G 1/048; G08G 1/052; G08G 1/054; G08G 1/056; G08G 1/065; G08G 1/07; G08G 1/075; G08G 1/08; G08G 1/081; G08G 1/082; G08G 1/083; G08G 1/085; G08G 1/087; G08G 1/09; G08G 1/091; G08G 1/092; G08G 1/093; G08G 1/094
USPC ............. 701/93, 96, 117, 118, 119, 300, 437
See application file for complete search history.

(56) References Cited

U.S. PATENT DOCUMENTS

| | | | | |
|---|---|---|---|---|
| 5,839,086 | A * | 11/1998 | Hirano | 701/420 |
| 6,169,495 | B1 * | 1/2001 | Koike | 701/302 |
| 2002/0077742 | A1 * | 6/2002 | Mintz | 701/117 |
| 2005/0140523 | A1 * | 6/2005 | Publicover | 340/907 |

FOREIGN PATENT DOCUMENTS

CN    1441369 A    9/2003

OTHER PUBLICATIONS

Dresner, Kurt, (Multiagent Traffic Management: A Reservation-Based Intersection Control Mechanism) The Third International Joint Conference on Autonomous Agents and Multiagent Systems., (AAMAS 04) pp. 530-537, New York, New York, USA, Jul. 2004.

* cited by examiner

Primary Examiner — Jerrah Edwards
(74) Attorney, Agent, or Firm — John A. Miller; Miller IP Group, PLC

(57) ABSTRACT

A system and method for efficiently and continuously allowing vehicles to travel through an intersection. The method includes broadcasting a synchronization signal to all vehicles that will be entering the intersection and broadcasting an intersection flow time to all of the vehicles that will be entering the intersection that identifies which travel lanes travel in what direction. The method also includes identifying an arrival synchronization pattern for all of the vehicles that will be entering the intersection and controlling a speed of the vehicles traveling through the intersection and a time for the vehicles entering the intersection so that vehicles traveling in perpendicular or cross directions to the intersection will simultaneously travel through the intersection without colliding with each other.

18 Claims, 6 Drawing Sheets

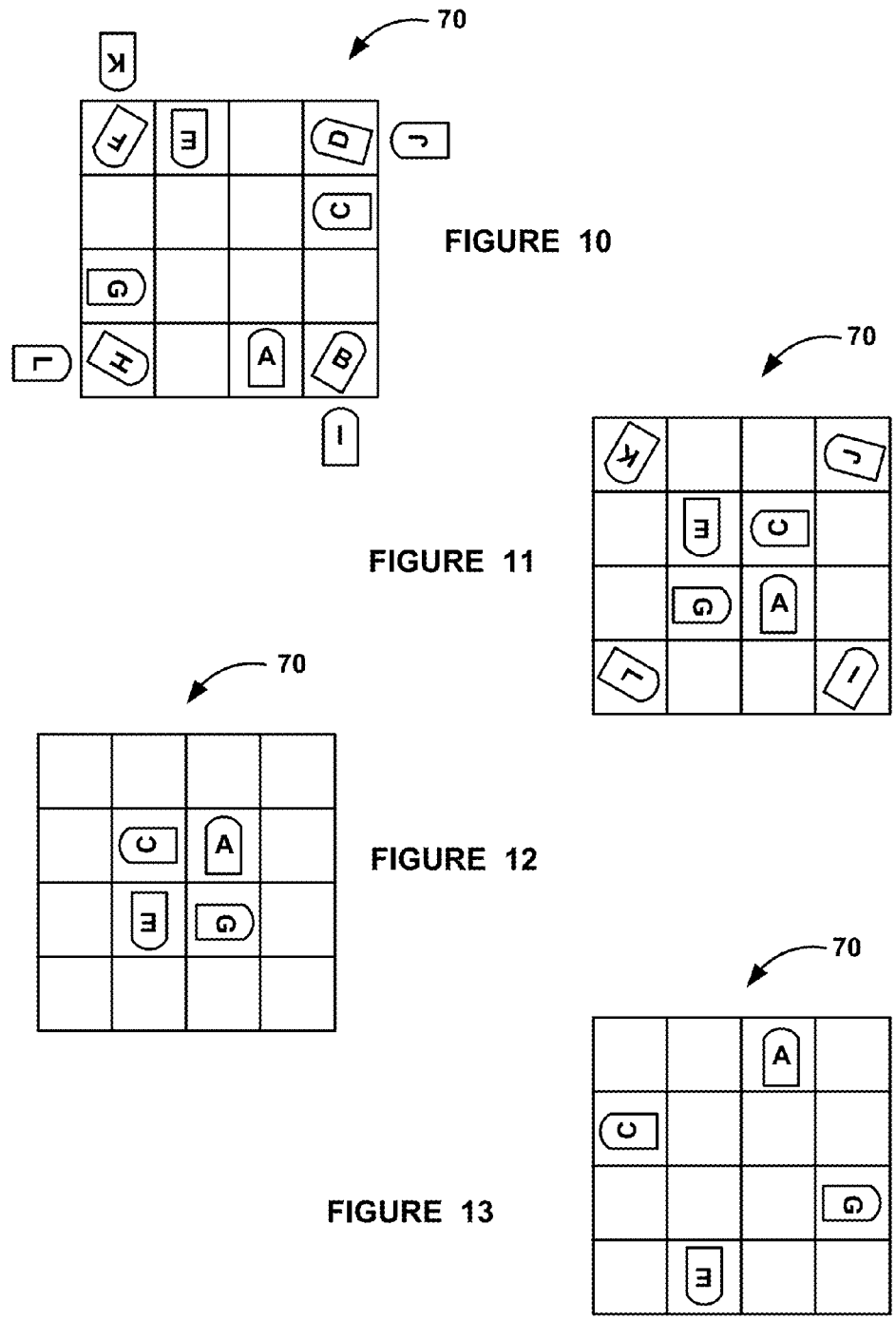

EFFICIENT INTERSECTION AUTONOMOUS DRIVING PROTOCOL

BACKGROUND OF THE INVENTION

1. Field of the Invention

This invention relates generally to a system and method for providing control of vehicle steering and speed through an intersection and, more particularly, to a system and method for providing autonomous control of vehicle steering and speed through an intersection, where the intersection is defined as to whether it allows vehicle travel in certain lanes straight through the intersection, left turns, right turns, or combinations thereof.

2. Discussion of the Related Art

The operation of modern vehicles is becoming more autonomous, i.e., being able to provide driving control with less and less driver intervention. Cruise control systems have been on vehicles for a number of years where the vehicle operator can set a particular speed of the vehicle, and the vehicle will maintain that speed without the driver operating the throttle. Adaptive cruise control systems have been developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect the vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a completely autonomous vehicle. For example, future vehicles probably will employ autonomous systems for lane changing, passing, turns away from traffic, turns into traffic, etc. As these systems become more prevalent in vehicle technology, it will also be necessary to determine what the driver's role will be in combination with these systems for controlling vehicle speed and steering, and overriding the autonomous system.

Vehicular ad-hoc network based active safety and driver assistance systems allow a wireless vehicle communications system, such as a dedicated short range communication (DSRC) system, known to those skilled in the art, to transmit messages to other vehicles in a particular area with warning messages about driving conditions. In these systems, multi-hop geocast routing protocols, known to those skilled in the art, are commonly used to extend the reachability of the warning messages, i.e., to deliver active messages to vehicles that may be a few kilometers away, as a one-time multi-hop transmission process. In other words, an initial message advising drivers of a certain situation is transmitted from vehicle to vehicle using the geocast routing protocol so that relevant vehicles a significant distance away will receive the messages where one vehicle's direct transmission range is typically relatively short.

Vehicle-to-vehicle (V2V) and vehicle-to-infrastructure (V2X) communications systems require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the safety application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

When roads cross intersections are created. In order to prevent vehicles from colliding with each other at an intersection, some type of traffic control mechanism, such as stop signs, yield signs, traffic lights, etc., are provided so that perpendicularly or cross traveling traffic can navigate safely through the intersection. However, intersections, especially high traffic intersections, are still the cause of many traffic collisions. Further, because traffic traveling in one direction is generally stopped at busy intersections to allow traffic to flow in another direction, an intersection creates traffic congestion and frustration. Autonomously driven vehicles and controlled intersections offer an opportunity to safely and efficiently allow vehicles traveling in perpendicular or cross directions to safely navigate an intersection.

Enhanced traffic throughput safely at busy intersections with autonomous driving is technically challenging and an unresolved problem. Known techniques to accomplish this goal typically employ a central arbiter module, such as an intersection manager, to resolve space-time conflicts between vehicles and dispatch space-time reservations to communication equipped vehicles approaching the intersection. However, the practicality of such an arbiter module to resolve conflicts and reserve space-time slots in a timely manner is still unknown due to maintenance and operation issues of a computationally complex arbiter at traffic intersections.

SUMMARY OF THE INVENTION

In accordance with the teachings of the present invention, a system and method are disclosed for efficiently and continuously allowing vehicles to travel through an intersection. The method includes broadcasting a synchronization signal to all vehicles that will be entering the intersection and broadcasting an intersection flow time to all of the vehicles that will be entering the intersection that identifies which travel lanes travel in what direction. The method also includes identifying an arrival synchronization pattern for all of the vehicles that will be entering the intersection and controlling a speed of the vehicles traveling through the intersection and a time for the vehicles entering the intersection so that vehicles traveling in perpendicular or cross directions to the intersection will simultaneously travel through the intersection without colliding with each other.

Additional features of the present invention will become apparent from the following description and appended claims, taken in conjunction with the accompanying drawings.

BRIEF DESCRIPTION OF THE DRAWINGS

FIGS. 10-13 are illustrations of the intersection shown in FIG. 3 at consecutive time intervals showing vehicles traveling straight through and turning right at the intersection;

DETAILED DESCRIPTION OF THE EMBODIMENTS

The following discussion of the embodiments of the invention directed to a system and method for controlling vehicle travel through an intersection is merely exemplary in nature, and is in no way intended to limit the invention or its applications or uses.

As will be discussed in detail below, the present invention proposes a system and method that controls traffic flow through an intersection to efficiently and continuously allow vehicles to enter and cross the intersection at synchronized and staggered time slots. A particular intersection will have a defined traffic flow pattern including whether a particular travel lane only allows straight travel through the intersection, only allows left turns through the intersection and/or only allows right turns through the intersection. Each vehicle approaching the intersection will receive information from a suitable source as to the particular traffic pattern for the intersection and a synchronization signal that defines how the vehicle will enter the intersection and at what speed. The information can be provided to the vehicles in any suitable manner, such as by etc. The vehicles traveling through the intersection will maintain that speed through the intersection. These signals can be transmitted to the approaching vehicle in any suitable manner, such as through the internet, satellite, V2V or V2I wireless communications, an intersection wireless device, for example, DSRC, WiFi, etc., radio service, for example, XM or other internet-based server, cellular signals from a remote server, etc. Alternatively, GPS timing signals can be used for time synchronization, and travel lanes/intersection entering time pattern can be residing onboard the vehicle for a given intersection.

The V2I and/or V2V wireless communications can be employed to deal with anomalies such as vehicle breakdowns or other mishaps. Further, multiple intersections can be coordinated along a particular stretch of road. For autonomously controlled vehicles, this information will be automatically provided to the vehicle controller where the vehicle follows the planned route through the intersection. In other cases, it is possible for the vehicle to be operated manually through the intersection as long as the vehicle driver maintains the necessary synchronization and speed of the vehicle. By providing such a system where vehicles traveling through an intersection in cross directions can simultaneously navigate the intersection, an optimal thru-put and capacity utilization of a traffic intersection can be provided.

Figure 1:
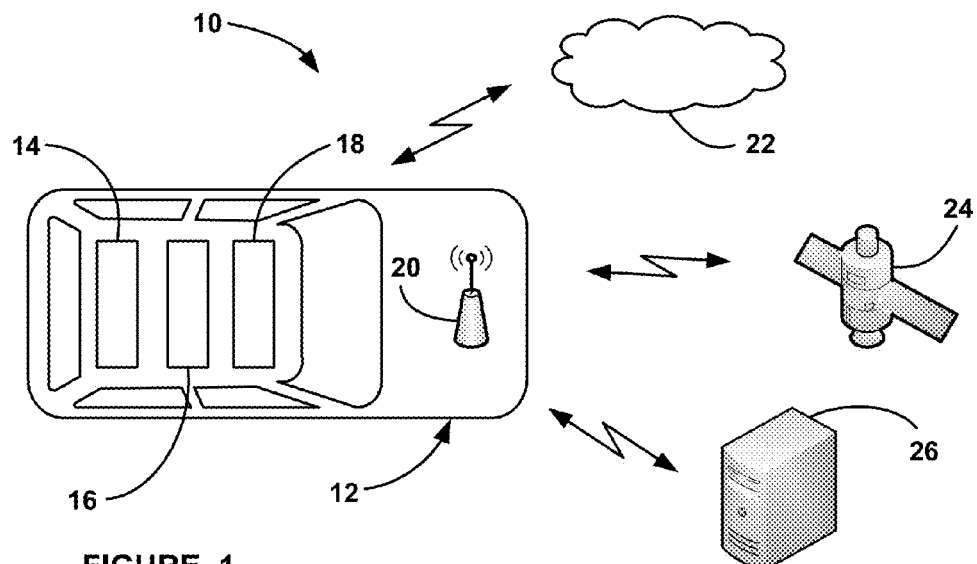
FIG. 1 is an illustration of a vehicle communications system showing a vehicle transmitting and receiving information wirelessly from various sources.

FIG. 1 is a simple illustration of a vehicle communications system 1 that may include V2I and V2V communications of the type discussed above. The communications system 10 includes a vehicle 12 having a map database 14, a navigation system 16 and an autonomous vehicle controller 18. The map database 14 stores map information at any level of detail that is available, including specific information about intersections, such as the number of lanes, the lane travel patterns, etc. The map database 14 operates in association with the navigation system 16 to display the various maps and other information that is available, and allow a user to input, plan and display a route. Also, the map database 14 can store the information concerning what intersection allows travel in what directions, as will become apparent from the discussion below. The controller 18 controls the operation of the vehicle 12, including steering, brake, throttle, etc., if the vehicle 12 is autonomous or semi-autonomous, and provides any other vehicle control consistent with the discussion herein. The controller 18 includes a clock that can be synchronized to vehicle patterns at a particular intersection, also consistent with the discussion herein. The vehicle 12 also includes a wireless port 20 that allows the vehicle 12 to wirelessly transmit information and receive information from many sources, such as internet 22, satellite 24, a wireless infrastructure 26, etc. The wireless port 20 also allows the vehicle 12 to provide V2I and V2V communications.

Figure 2:
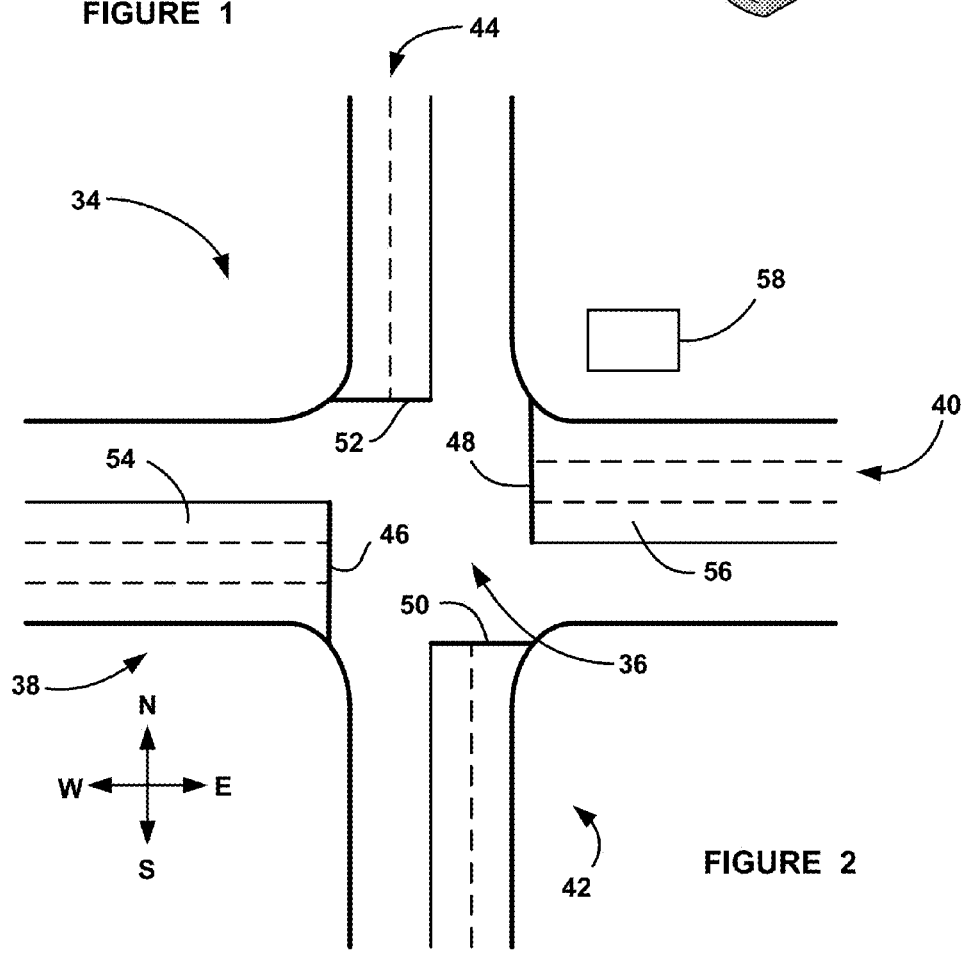
FIG. 2 is an illustration of an intersection showing vehicle lanes allowing vehicle travel north, south, east and west through the intersection.

FIG. 2 is an illustration of a roadway 34 showing an intersection 36, east-bound lanes 38 approaching the intersection 36, west-bound lanes 40 approaching the intersection 36, north-bound lanes 42 approaching the intersection 36 and south-bound lanes 44 approaching the intersection 36. Line 46 is a stop location for the lanes 38 before the intersection 36, line 48 is a stop location for the lanes 40 before the intersection 36, line 50 is a stop location for the lanes 42 before the intersection 36 and line 52 is a stop location for the lanes 44 before the intersection 36. The stop lines 46-52 represent a place where a vehicle traveling in a particular lane needs to stop so that it enters the intersection 36 at the proper time to be in synchronization with vehicles in the other lanes, as will become apparent from the discussion below. The roadway 34 has a specific and defined traffic flow pattern that only allows vehicles in a particular lane to travel in a particular direction. In this example, all of the north-bound lanes 42 and the south-bound lanes 44 must travel straight through the intersection 36, and cannot turn. Further, lane 54 of the east-bound lanes 38 and lane 56 of the west-bound lanes 40 must turn left through the intersection 36, where the other two east-bound lanes 38 and west-bound lanes 40 must travel straight through the intersection 36. In this illustration, box 58 is an intersection control device that wirelessly broadcasts the type of intersection, which lanes are able to travel in which direction and the synchronization clock that all of the vehicles traveling through the intersection 36 must be synchronized to before the vehicles reach the intersection 36. Each of the lanes shown in roadway 34 may have a particular code identified with it that could be stored in the map database 14, and identify which lane the vehicle 12 needs to be in to travel in a particular direction.

Figure 3:
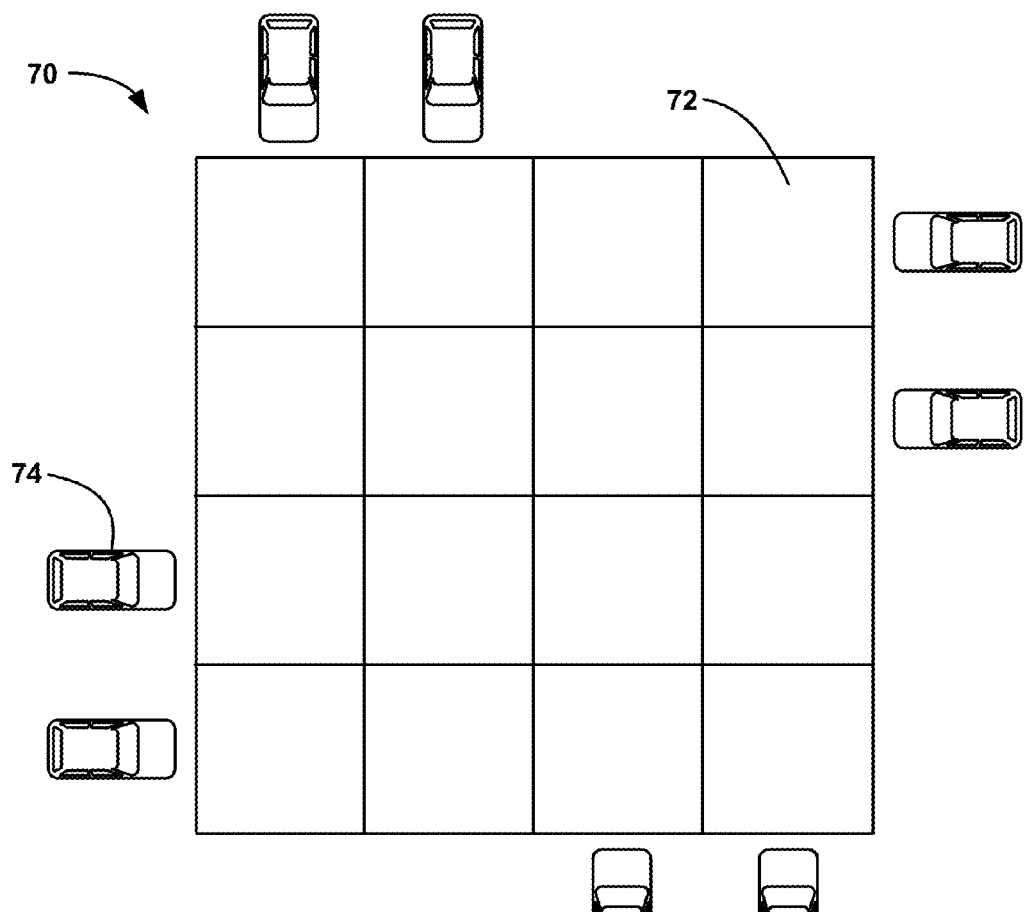
FIG. 3 is an illustration of an intersection separated into time slot cells and showing vehicles about to enter the intersection for travel in two lanes in all of the north, south, east and west directions.

FIG. 3 is an illustration of an intersection 70 with the approach lanes removed. The intersection 70 is a representation of an intersection with two travel lanes for each direction of travel. For an intersection of this size with this many travel lanes, the intersection 70 is separated into sixteen time slot cells 72, where each cell represents a location that a vehicle could be in at any particular point in time for a particular traffic flow pattern. Vehicles 74 are shown at the position where they would enter a first one of the time slot cells 72 in the intersection 70 depending on the vehicle's travel lane and travel direction.

As will be discussed below, the intersection 70 will be designated for a particular traffic flow pattern, such as all lanes travel straight, right lane travels right and other lanes travel straight, left lane travels left and right lane travels right, left lane travels left and other lanes travel straight, etc. Depending on the flow pattern for a particular intersection, each intersection will have an intersection arrival time pattern. The arrival time pattern is intended to represent the timing of the vehicles 74 entering the intersection 70, and not specifically the positional pattern of the vehicle 74 arriving at the intersection 70, although it can be. In other words, as will become apparent from the discussion below, in order to prevent the vehicles from colliding with each other, only one vehicle 74 can be in a particular cell 72 at a particular point in time. By staggering the entry of the vehicles 74 into the intersection 70 based on time, a particular time slot cell 72 will be vacated by one vehicle 74 before the next vehicle 74 enters that time slot cell 72. Thus, depending on traffic volume and other factors, the autonomous and/or V2V control of the vehicle 74 can control the vehicles 74 so that they arrive at the intersection 70 in a staggered format or are stopped at the stop lines 46-52 until the time for the particular vehicle 74 to enter the intersection 70 arrives.

Figure 4:
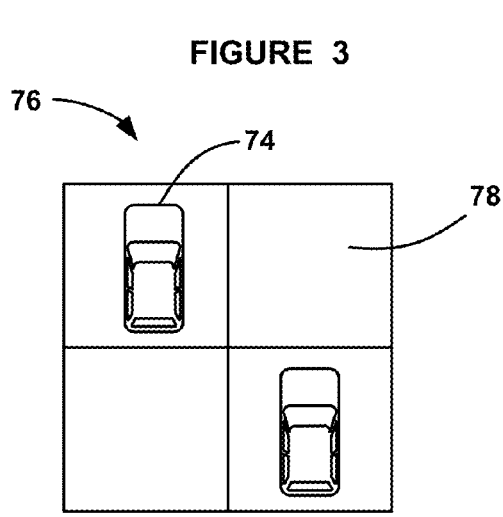
FIG. 4 is an illustration of a vehicle timing pattern for the time slot cells shown in FIG. 3 for vehicles traveling in two lanes straight through the intersection.
Figure 5:
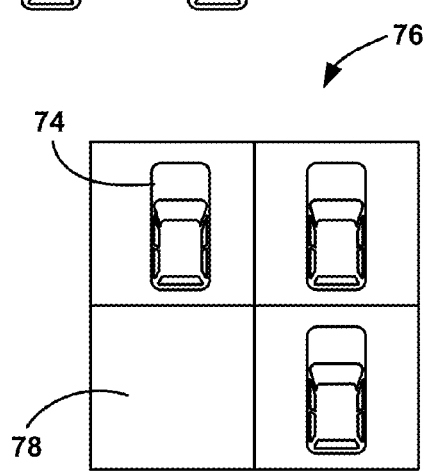
FIG. 5 is an illustration of a vehicle timing pattern for the time slot cells shown in FIG. 3 for vehicles traveling in two lanes, where one lane is straight through the intersection and the other lane turns right or left.

FIG. 4 is an illustration of a time slot pattern 76 showing four time slot cells 78 that identifies an arrival pattern of the vehicles 74 into the intersection 70 for each direction of travel for an intersection flow pattern where all of the lanes go straight. FIG. 5 is an illustration of the time slot pattern 76 that identifies an arrival pattern of the vehicles 74 into the intersection 70 for each direction of travel for an intersection flow pattern where the left lane goes straight and the right lane turns right.

Figure 6:
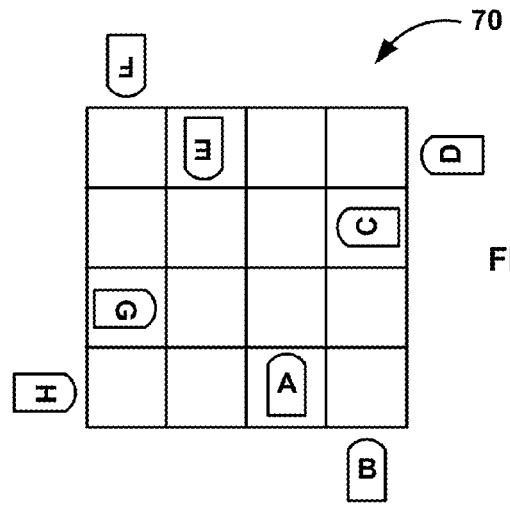
FIGS. 6-9 are illustrations of the intersection shown in FIG. 3 at consecutive time intervals showing vehicles traveling straight through the intersection.
Figure 7:
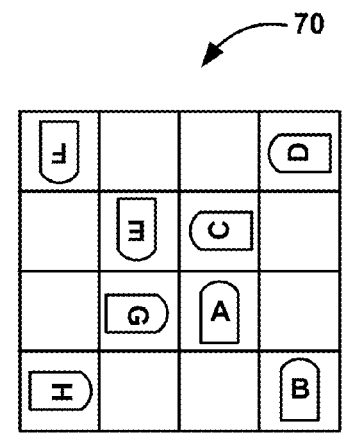
Figure 8:
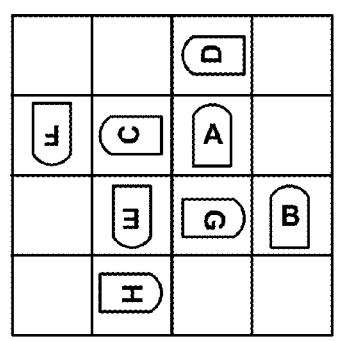

FIGS. 6-9 illustrate the intersection 70 showing the traffic flow pattern where all of the travel lanes travel straight, and no turning at the intersection 70 is allowed. In this example, the arrival pattern is shown in FIG. 4 where the vehicles 74 in the left lane of the particular travel direction enter the intersection 70 at one time slot and the vehicles 74 in the right lane enter the intersection 70 at the next time slot. In this illustration, the vehicles 74 are represented by a box having a rounded end with a letter designating a particular vehicle, where the rounded end shows the travel direction of the vehicle. FIG. 6 shows that the vehicles in the left travel lanes have entered the intersection 70 at the next time slot from the time slot shown in the configuration of FIG. 3. At each next time slot represented by the next figure, the particular vehicle advances to the next time slot cell 72. As is clear by viewing this sequence of flow of the vehicles 74 through the intersection 70 based on this timing pattern, a particular vehicle will be entering a time slot cell 72 that is either previously vacant or is being vacated by a vehicle from a previous time slot, and where no other vehicle is entering that time slot cell 72.

Figure 9:
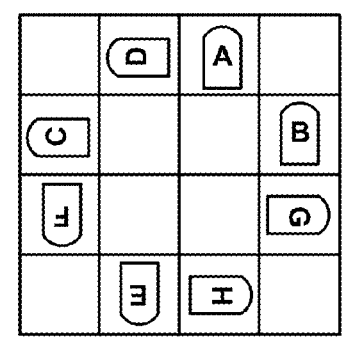
Figure 14:
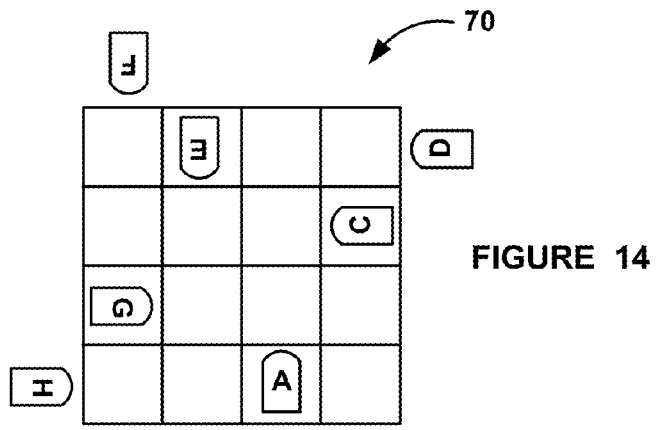
FIGS. 14-17 are illustrations of the intersection shown in FIG. 3 at consecutive time intervals showing vehicles traveling straight through and turning left at the intersection.
Figure 15:
Figure 16:
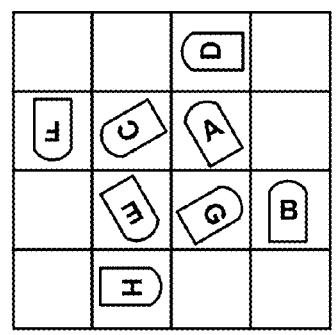
Figure 17:
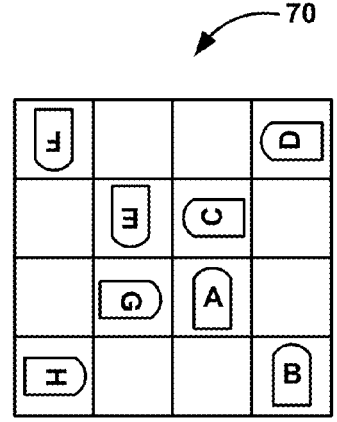

It is straight forward to imagine that at a next time slot beyond FIG. 9, vehicles A, C, E and G will exit the intersection 70 and at the next time slot after that, the remaining vehicles B, D, F and H will exit the intersection 70, where, it takes five time slots for a particular vehicle to enter and then exit the intersection 70. It is also straight forward to imagine that other vehicles that enter the intersection 70 behind the vehicles A-H and at the same timing and synchronization pattern will also pass through the intersection 70 in the same manner without colliding with any other vehicles. It is further straight forward to imagine that based on this flow, at any particular point in time it is either the right lane vehicle entering the intersection 70 before the left lane vehicle or the left lane vehicle entering the intersection before the right lane vehicle. Thus, if all of the vehicles 74 have the same speed that is synchronized to the size of the time slot cells 72, the vehicles 74 will travel straight through the intersection without colliding with each other.

FIGS. 10-13 show a representation of the intersection 70 for a traffic flow pattern where the right lane in a particular travel is required to turn right and the left lane in a particular travel direction is required to go straight. For intersections synchronized in this manner, the traffic arrival pattern is as shown in FIG. 5, where vehicles turning right can enter the intersection 70 at every time slot. New vehicles I-L are shown in FIGS. 10-13 to illustrate this. The right turning vehicles, B, D, F and H-L enter the intersection 70 at one time slot and exit the intersection at the next time slot, where it still takes five time slots for the straight traveling vehicles A, C, E and G to travel through the intersection 70.

FIGS. 14-17 show a representation of the intersection 70 for a traffic flow pattern where the left lane in a particular travel direction is required to turn left and the right lane in a particular travel direction is required to go straight. In this traffic orientation and flow, it takes the straight traveling vehicles B, D, F and H five time slots to travel through the intersection 70 and the left turning vehicles A, C, E and G six time slots to travel through the intersection 70.

Based on the synchronization and timing of the left and right turning vehicles shown in FIGS. 10-17, it is straight forward to realize an intersection having two travel lanes in each direction that allow only left turns from the left lane and only right turns from the right lane where no straight lines are allowed.

Figure 18:
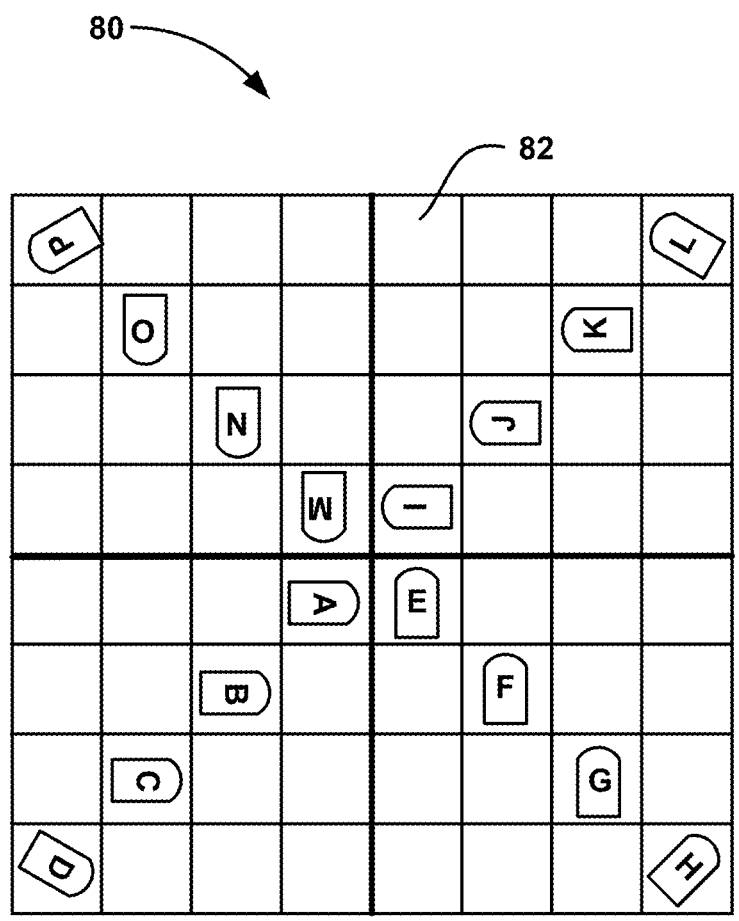
FIG. 18 is an illustration of an intersection showing vehicle travel in four lanes for all directions where the right lane turns right, the two middle lanes go straight and the left lane turns left.
Figure 19:
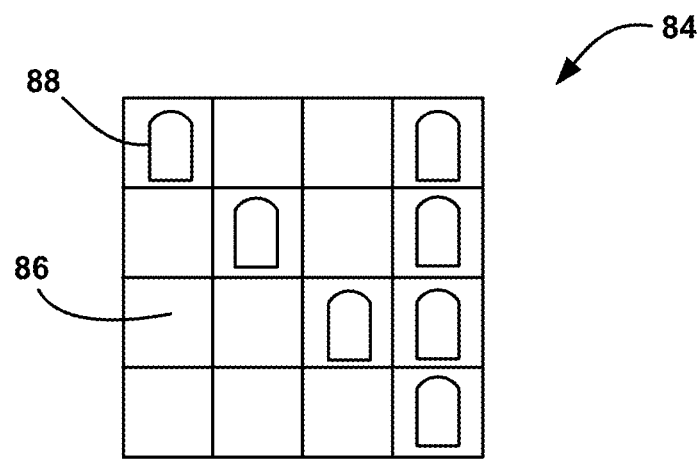
FIG. 19 is an illustration of a vehicle timing pattern for the time slot cells for the intersection shown in FIG. 18.

The flow pattern, synchronization and orientation discussed above can be extended to all sizes of intersections having one lane or multiple lanes, including intersections having different numbers of lanes traveling in different directions, such as shown in FIG. 2. To help illustrate this, FIG. 18 shows an intersection 80 separated into time slot cells 82 that includes four travel lanes in each direction. For the intersection 80, in each direction, the left lane turns left, the right lane turns right and the two center lanes travel straight. FIG. 19 shows an intersection arrival pattern 84 including time slot cells 86 showing the arrival orientation of vehicles 88 for the intersection 80. FIG. 18 shows the time slot where the particular vehicle A, E, I and M that is turning left has traveled four time slots to the center of the intersection 80. For those vehicles D, H, L and P turning right, it takes two time slots for the vehicle to enter and exit the intersection 80. For those vehicles B, C, F, G, J, K, N and O traveling straight, it takes nine time slots for the vehicle to enter and exit the intersection 80. For those vehicles A, E, I and M turning left, it takes ten time slots to enter and exit the intersection 80. The intersection 80 may represent the optimum number of vehicles that can transverse any intersection based on the patterns discussed herein.

The size of the time slot cells 72 is determined by a reasonable speed of travel through the intersection and may vary from intersection to intersection. The faster the controlled speed of the vehicles 74, the smaller the time slot cells 72 need to be. Further, the size of the time slot cells 72 is determined by the size of the vehicles. If the size of the time slot cells 72 is set for a certain size vehicle, then concessions need to be made for larger vehicles, such as 18-wheel trucks. For those vehicles, it likely will be necessary to reserve more than one time slot for the vehicle at a particular point in time. It is also noted that although each intersection has a particular traffic pattern at any point in time, that traffic pattern can be changed depending on time of day, season, etc.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a flow of vehicles through an intersection, said method comprising:
    broadcasting a synchronization signal to all vehicles that will be entering the intersection, where the vehicles that will be entering the intersection are identified as vehicles traveling in lanes approaching the intersection and within a predefined proximity of the intersection;
    broadcasting an intersection flow type to all of the vehicles that will be entering the intersection, where the intersection flow type identifies a direction of travel through the intersection for each of the travel lanes;
    identifying an arrival synchronization pattern for all of the vehicles that will be entering the intersection; and
    controlling a speed of the vehicles traveling through the intersection and a time for the vehicles entering the intersection so that vehicles traveling in perpendicular or cross directions through the intersection will simultaneously travel through the intersection without colliding with each other, including defining a configuration of time slot cells for the intersection, where the speed of the vehicles and the time for the vehicles are controlled so that only one vehicle will be in a particular time slot cell at a particular time slot.

2. The method according to claim 1 wherein broadcasting a synchronization signal and an intersection flow type includes broadcasting from a wireless telematic unit located proximate the intersection.

3. The method according to claim 1 wherein the intersection has two travel lanes for each of four directions, and wherein the configuration of time slot cells has sixteen time slot cells.

4. The method according to claim 1 wherein the intersection has two travel lanes for each of four directions, and wherein the intersection flow type is all lanes travel straight through the intersection.

5. The method according to claim 1 wherein the intersection has two travel lanes for each of four directions, and wherein the intersection flow type is left lanes travel straight through the intersection and right lanes turn right through the intersection for all four directions.

6. The method according to claim 1 wherein the intersection has two travel lanes for each of four directions, and wherein the intersection flow type is left lanes turn left through the intersection and right lanes travel straight through the intersection for all four directions.

7. The method according to claim 1 wherein the intersection has two travel lanes for each of four directions, and wherein the intersection flow type is left lanes turn left through the intersection and right lanes turn right through the intersection.

8. The method according to claim 1 wherein the intersection has four travel lanes for each of four directions, and wherein the intersection flow type is left lanes turn left through the intersection, right lanes turn right through the intersection and two middle lanes travel straight through the intersection for all four directions.

9. The method according to claim 1 further comprising reserving one or more extra time slot cells for vehicles having a length greater than a standard vehicle length upon which a size of the time slot cells is based.

10. The method according to claim 1 wherein the vehicles are autonomously driven vehicles.

11. A system for controlling a flow of vehicles through an intersection, said system comprising:
    an intersection control device located proximate to the intersection, said intersection control device being configured to broadcast an intersection flow type and a synchronization signal to all vehicles that will be entering the intersection, where the intersection flow type identifies a direction of travel through the intersection for each travel lane of the intersection and the synchronization signal identifies a speed to be used by the vehicles that will be entering the intersection, and where the vehicles that will be entering the intersection are identified as vehicles traveling in lanes approaching the intersection and within a predefined proximity of the intersection;
    a wireless transceiver onboard each of the vehicles; and
    a vehicle controller onboard each of the vehicles, said vehicle controller being configured to control the steering, brakes and throttle of its host vehicle based on information received from the intersection control device via the wireless transceiver,
    where the intersection control device identifies an arrival synchronization pattern for all of the vehicles that will be entering the intersection, where the arrival synchronization pattern is defined and communicated to the vehicle controllers so that vehicles traveling in perpendicular or cross directions through the intersection will simultaneously travel through the intersection without colliding with each other, including defining a configuration of time slot cells for the intersection, and where the speed of the vehicles and the time for the vehicles are controlled by the vehicle controllers so that only one vehicle will be in a particular time slot cell at a particular time slot.

12. The system according to claim 11 wherein the intersection control device communicates with the wireless transceivers using vehicle-to-infrastructure (V2I) and vehicle-to-vehicle (V2V) technology.

13. The system according to claim 11 wherein the intersection has two travel lanes for each of four directions, and wherein the configuration of time slot cells has sixteen time slot cells.

14. The system according to claim 11 wherein the intersection has two travel lanes for each of four directions, and wherein the intersection flow type is all lanes travel straight through the intersection.

15. The system according to claim 11 wherein the intersection has two travel lanes for each of four directions, and wherein the intersection flow type is left lanes travel straight through the intersection and right lanes turn right through the intersection for all four directions.

16. The system according to claim 11 wherein the intersection has two travel lanes for each of four directions, and wherein the intersection flow type is left lanes turn left through the intersection and right lanes travel straight through the intersection for all four directions.

17. The system according to claim 11 wherein the intersection has two travel lanes for each of four directions, and wherein the intersection flow type is left lanes turn left through the intersection and right lanes turn right through the intersection.

18. The system according to claim 11 wherein the intersection has four travel lanes for each of four directions, and wherein the intersection flow type is left lanes turn left through the intersection, right lanes turn right through the intersection and two middle lanes travel straight through the intersection for all four directions.

* * * * *